United States Patent [19]
McIntosh et al.

[11] 3,924,268
[45] Dec. 2, 1975

[54] HIGH DENSITY TRACK FOLLOWER CONTROL SYSTEM FOR MAGNETIC DISK FILE

[75] Inventors: Robert P. McIntosh, Saratoga, Calif.; Hussein I. Shahein, Cairo, Egypt

[73] Assignee: International Business Machines Corporation, Armonk, N.Y.

[22] Filed: Aug. 5, 1974

[21] Appl. No.: 494,612

[52] U.S. Cl. .................... 360/78; 318/617; 360/77; 360/97
[51] Int. Cl.[2] ...................... G11B 21/08; G11B 5/56
[58] Field of Search ............ 360/78, 77, 75, 86, 97, 360/99, 109, 106; 318/616, 617

[56] References Cited

UNITED STATES PATENTS

| | | | |
|---|---|---|---|
| 3,298,008 | 1/1967 | Smith et al. | 360/78 |
| 3,562,725 | 2/1971 | Klein et al. | 360/78 |
| 3,643,242 | 2/1972 | Bryer | 360/98 |
| 3,699,555 | 10/1972 | Du Vall | 360/77 |
| 3,733,592 | 5/1973 | Applequist et al. | 360/78 |

*Primary Examiner*—Alfred H. Eddleman
*Attorney, Agent, or Firm*—Fraser and Bogucki

[57] ABSTRACT

A control system for positioning a magnetic disk transducer head includes a primary carriage which provides large magnitude positioning movements and supports in a "piggyback" arrangement a low mass secondary carriage which positions the head relative to the primary carriage to provide highly accurate, extremely fast response over small distances on the order of one track width. Improved operating characteristics are obtained to permit increased track density by simultaneously and continuously controlling both carriages in response to a single position error signal with the secondary carriage being biased toward a zero displacement position relative to the primary carriage.

18 Claims, 2 Drawing Figures

HIGH DENSITY TRACK FOLLOWER CONTROL SYSTEM FOR MAGNETIC DISK FILE

BACKGROUND OF THE INVENTION

1. Field of the Invention

This invention relates generally to servo positioning systems and more particularly to dual actuator systems for use in connection with magnetic disk files having high track densities.

2. Description of the Prior Art

In random access memory systems employing rotatable disks having magnetizable surfaces, discrete areas of the surfaces are magnetized along concentric tracks in accordance with signals representing the information or data to be stored. The data signals are transferred to and from the disks by transducers which move radially on command to select specific tracks. The transducers are typically mounted on a carriage assembly whose displacement is controlled by an actuator device.

As the number of tracks per unit radius is increased in an endeavor to increase the information storage capacity of disk memories, improved precision in the positioning of the transducers relative to the data tracks is required. One approach to achieving such improved precision is to utilize each track for storing both data and transducer servo information.

One method of incorporating the transducer position servo information along the data track is to dedicate sectors of the disk to servo information whereby the servo information is sampled at a frequency dependent on the number of sectors and the speed of rotation of the disk. Thus, the transducer alternately senses information to control the position of the transducer relative to the track and stored data. In such a track following scheme, a rate sampled error signal whose magnitude and polarity represent the extent and direction of misalignment or tracking error is retained by a hold circuit and is acted upon by the transducer positioning servo system to reduce the transducer position error. As is well known, in some sample and hold systems only the last value of error may be held in which case the system is referred to as a zero order hold system. In error rate sampled systems with higher order hold schemes an error dependent upon two or more past error signals is indicated. The zero order hold arrangement has been found to provide the best stability for the control system presented herein and is easiest to implement; nevertheless, there is a loss of surface area which would otherwise be used for data and some response delay inherently exists simply because error signals are received at discrete times.

Various methods have been utilized and proposed for improving the stability and response characteristics of the foregoing track following systems. One method is to fill in the sampled error signal with a position signal in an attempt to recover the lost information between sampling. However, the fill-in scheme cannot be optimum in the sense of complete recovery of the error signal due to the inaccessibility of the actual position signal between samples. Another method is to force the error to be zero at a particular frequency of interest by designing compensators to take care of the phase lag and gain difference between the input and output of the continuous system. Such an approach, which may be called a "tuned filter compensation" technique also has drawbacks in that the open loop system tends to be unstable.

The second principal method of incorporating data and position servo signals along a single track is to superimpose such signals, for example, by recording them on a dual layer, dual coercivity disk, such as that disclosed in U.S. Pat. No. 3,614,756. Both the data and position signals are thereby continuously sensed by the transducer. Although the response and stability of such a continuous positioning servo surpasses that of the rate sampled systems and the entire surface area of the disk is dedicated to data, the dual layer disk is costly and the composite output of the transducer must be processed by appropriate detection circuitry to separate the position servo information from the data.

In certain existing disk memory systems, transducer positioning is made more accurate and less time consuming by first applying a coarse positioning signal to move a carriage carrying the transducer to within a predetermined error margin corresponding to a radial position placing the transducer in an operative relationship to the addressed track. After this track access mode, a fine positioning operation commences and continues to control the transducer position in a track-following mode. This dual control arrangement permits a substantial reduction in overall track width because of the precision of the track following mode but access time, track acquisition time and bandwidth are limited.

Still a further improvement resides in the use of a dual actuator device in which a primary carriage, driven by a primary actuator, supports in piggyback fashion a small, low mass secondary carriage movable relative to the primary carriage by means of a secondary actuator. The transducer is coupled to the secondary carriage and there are as many secondary carriages as there are transducers in the file. The primary actuator is capable of delivering a large force and displacement to move the dual carriage assembly rapidly for access to the entire band of tracks. Each secondary carriage, whose movement will typically be limited to a single track width, is used to follow the radial runout of the track. The secondary actuator and carriage assembly, which has very small mass compared to that of the primary carriage, is capable of fast response. The greater bandwidth response characteristic of the secondary carriage assembly permits the higher frequency components of runout as well as some components of vibration to be followed with considerable precision.

In the operation of the dual actuator device, subsequent to the track access mode during which both carriages are displaced as a unit under control of a coarse position signal, the primary carriage is locked in position, its actuator is made unresponsive to position error signals and the secondary carriage is then used to make fine position corrections. Typically, two servo control loops—a coarse loop and a fine loop—operating independently and sequentially are utilized.

SUMMARY OF THE INVENTION

The present invention substantially improves the stability and frequency response of the described dual carriage system to permit a substantial reduction of the transducer positioning tolerance so that significant increases in track densities can be made. For example, while currently available disk files have a radial density of the order of 300 tracks per inch, the present invention permits the extension of densities to more than 1000 tracks per inch.

Although the invention was developed in the context of a sectorized position servo system utilizing a sampled actual position feedback signal and therefore has particular application thereto, the teachings of the invention are applicable as well to continuous position error servo systems in which case the performance of such systems is substantially improved.

Broadly, the invention provides a novel technique for the near optimum control of a sampled data track following system. The system provides positioning over substantial radial distances as well as positioning precision and response rates which permit the transducer head to follow small variations in radial displacement of a recorded information track which occur as a magnetic disk rotates about a central axis at a speed of approximately 2000 to 4000 rpm.

A head positioning system in accordance with the invention includes basically a primary carriage which is transversely movable over an entire range of longitudinally extending recorded tracks on an information storage surface, a low mass secondary carriage coupled to transversely position the transducer over small distances on the order of one track width relative to the primary carriage and primary and secondary actuators coupled to position the primary and secondary carriages in response to primary and secondary actuator control signals, respectively. During a track following mode an error detector for detecting position error is coupled to receive actual and command position information and generate a continuously present position error signal in response thereto. The position error signal is compensated to generate an energization command signal. While the actual position is displaced at least one track width from the commanded position the system operates in a track access mode wherein the energization command signal is maintained at a constant, maximum amplitude with the polarity dependent upon the direction of the error. A primary actuator control circuit generates a primary actuator control signal in response to the energization command signal to position the primary carriage to reduce the position error and a secondary actuator control circuit generates a secondary actuator control signal in response to primary carriage energization information, such as primary carriage velocity information and primary carriage acceleration information which may be provided by the energization command signal. The secondary carriage may be biased toward a zero displacement position relative to the primary carriage by either a mechanical spring or an electronically simulated spring which may be implemented by including a secondary carriage relative displacement signal as a component of the secondary actuator control signal.

BRIEF DESCRIPTION OF THE DRAWINGS

A better understanding of the invention may be had from a consideration of the following detailed description taken in conjunction with the accompanying drawings in which.

DETAILED DESCRIPTION

Figure 1:
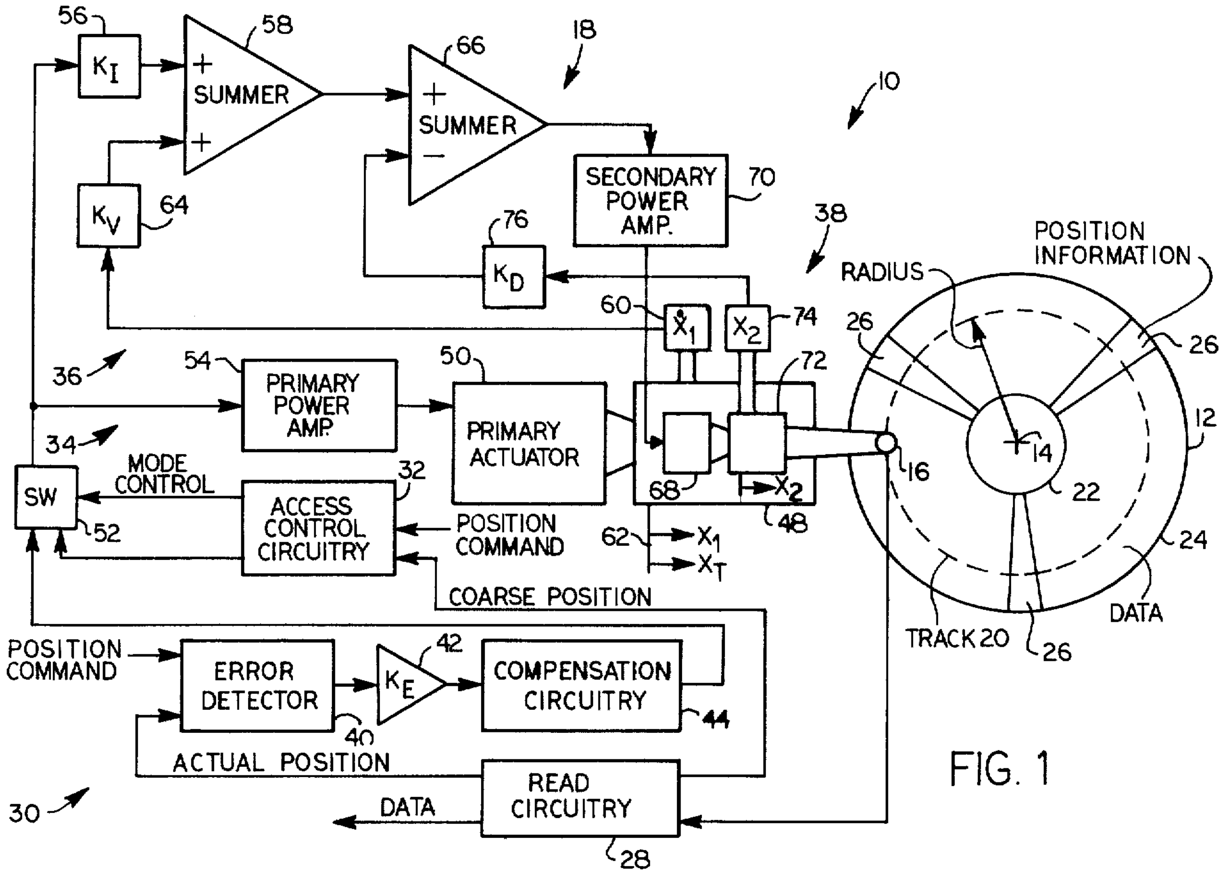
FIG. 1 is a block diagram representation of a high density track follower control system in accordance with the invention.

As shown in FIG. 1, a high density track follower control system 10 in accordance with the invention includes a magnetic disk 12, rotating about a central axis 14, a conventional disk transducer head 16 and a control system 18 coupled to radially position the transducer head 16 relative to the disk 12. Information is recorded on the magnetic disk 12 in a plurality of concentric tracks which are exemplified by a track 20. The concentric tracks extend in a transverse direction over a range of radii from an innermost track 22 to an outermost track 24 near the outer circumference of the disk 12.

As is conventional, each track 20 is divided into a plurality of sectors for the purpose of addressing information recorded on the disk 12. A plurality of these sectors which are representatively indicated by the sectors 26 contain recorded position information which is sensed by the head 16 to indicate the particular track 20 at which the transducer head 16 is located as well as the position of the transducer head 16 relative to the center of a particular track 20. Such recording schemes are conventional and will not be further discussed here. In other conventional recording schemes, the actual track position information is recorded continuously along the length of each track 20 in superposition with data information. While the specific method of detecting and indicating the actual position radii of the transducer head 16 relative to disk 12 is not important to the invention, it will be assumed for purposes of this description that the head position information is recorded in a plurality of angularly spaced sectors 26.

The control system 18 includes read circuitry 28, track follow control circuitry 30, access control circuitry 32, a primary carriage control subsystem 34, a secondary carriage control subsystem 36, and a positioning mechanism 38 which radially positions the transducer head 16 under control of the primary and secondary carriage control subsystems 34 and 36.

Read circuitry 28 receives and amplifies information which is generated by the transducer head 16 in response to information recorded on the magnetic disk 12. After suitable amplification, the transducer head information is separated into position and data information with the data information being communicated to data processing circuitry (not shown). The position information is processed by read circuitry 28 to generate position signals which are periodically generated each time one of the position information sectors 26 passes beneath the transducer head 16. This position information is utilized by the read circuitry 28 to generate an actual position signal which indicates the position of the transducer head 16 relative to the center of the tracks 20 and a coarse position signal indicative of the general position of head 16 relative to the tracks 20.

The track follow control circuitry 30 includes an error detector 40, an amplifier 42 having a gain $K_E$ and compensation circuitry 44. Error detector 40 receives the actual position feedback information as well as position command information and includes circuitry for generating a position error signal indicative of the displacement of head 16 from the center of a commanded track. Error detector 40 also includes a sample and hold circuit which holds the position error signal constant between error update times. The position error signal is updated in response to the periodic actual position information from read circuitry 28 and in response to new position commands. The position commands may be generated by conventional disk memory circuitry in response to system requirements that particular track 20 of disk 12 be addressed.

After suitable amplification by amplifier 42 the position error signal from error detector 40 is communicated to compensation circuitry 44. Although in general any conventional compensation may be employed to improve the frequency response of the system, in the present example it has been found to be advantageous to utilize lead compensation with a pole and zero symmetrically located about a desired unity gain crossover frequency.

The access control circuitry 32 receives a position command signal and a coarse position signal from read circuitry 28. The position command signal must at least be sufficient to indicate a commanded track 20. The coarse position signal must be sufficient to enable the access control circuitry to determine the track over which the transducer head 16 is positioned. As one example, the access control circuitry might include a register which receives and stores a position command number which indicates a commanded track position, a counter which is incremented or decremented in response to the coarse signal to indicate the actual track above which the head 16 is positioned, and a comparator for indicating whether or not the states of the register and counter differ by more than a count of 1. If the difference is two or more a large, constant magnitude access control signal is generated having a polarity selected to drive the head 16 so as to reduce the error and a mode control signal which indicates a track access mode is generated. If the error is less than two, the access control signal is terminated and a mode control signal which indicates a track follow mode is generated. A mode control switch 52 operates in response to the mode control signal from access control circuitry 32 to output an energization control signal equal to the position error signal for a track follow mode and equal to the access control signal from access control circuitry 32 during a track access mode of operation.

After suitable amplification by a primary power amplifier 54, the compensated energization control signal, which is proportional to the acceleration of a primary carriage 48, is utilized to drive a primary actuator 50 for positioning primary carriage 48. The energization control signal is also communicated through an amplifier 56 providing suitable amplification $K_f$ to one terminal of a summer 58. Amplifier 56 is designed to saturate in response to the large track access mode energization control signal by generating an output having a maximum amplitude which does not damage the control system 18. A velocity detector 60 is connected to generate a velocity signal $\dot{X}_1$ in response to the motion of the primary carriage 48 forming part of the head positioning mechanism 38. Primary carriage 48 is moved by primary actuator 50 to provide a displacement $X_1$ with respect to a reference plane 62 which is fixed with respect to central axis 14 of disk 12. Displacement $X_1$ is thus indicative of the radial motion of the primary carriage 48 with respect to disk 12. The velocity signal $\dot{X}_1$ represents the derivative of displacement $X_1$ with respect to time. The primary carriage velocity signal $\dot{X}_1$ is amplified by an amplifier 64 having suitable gain $K_V$ and utilized to drive a second input of summer 58. The direction coordinates and signal polarities are chosen such that a primary carriage velocity $\dot{X}_1$ in a direction which tends to reduce the position error signal also tends to reduce the magnitude of a velocity compensated energization signal output by summer 58 in response to the summation of the energization command signal and the primary carriage velocity signal.

The velocity compensated energization signal drives one input of a second summer 66 which generates a secondary actuator control signal at the output thereof to drive a secondary actuator 68 after suitable amplification by a secondary power amplifier 70. A second, inverting input to summer 66 is responsive to a position signal $X_2$ which indicates the displacement of a secondary carriage 72 relative to the primary carriage 48. A position detector 74 senses the relative position of secondary carriage 72 to generate the secondary carriage position signal $X_2$ which is suitably amplified by an amplifier 76 having a gain $K_D$ and suitable lag compensation prior to coupling to the inverting input of summer 66. The $X_2$ relative displacement signal operates to bias the control for secondary actuator 68 to tend to bias the relative displacement $X_2$ toward zero.

Primary actuator 50 is coupled to position the primary carriage 48 and may be implemented with a conventional rotary motor having suitable linkage, a linear motor such as a voice coil motor, or even with a hydraulic or a pneumatic actuator. Primary actuator 50 provides the positioning of transducer head 16 over the length of the radial displacement between the inner track 22 and the outer track 24. The primary actuator 50 should be capable of moving the primary carriage 48 over a displacement of several inches in response to amplified energization control signals from switch 52 and amplifier 54.

The primary carriage 48 is disposed to provide the basic support structure for the transducer head 16, the secondary carriage 72 and the secondary actuator 68 while the transducer head 16 is moved radially for positioning over the various tracks 20 which are available for recording. Primary carriage 48, including secondary actuator 68, may have a mass of approximately 0.002 to 0.0008 pounds-sec²/inch, for example, and is of substantially greater mass than secondary carriage 72.

Secondary actuator 68 is mounted on primary carriage 48 to provide extremely rapid, small displacement positioning of transducer head 16 of the order of ±500 microinches relative to the primary carriage 48. The secondary actuator 68 may be implemented as a piezoelectric actuator of either the length expander bar type or the cantilever mounted flexture mode bimorph type. As an alternative, the secondary actuator 68 might be implemented as a small membrane-supported moving coil actuator such as those commonly used in audio tweeters. The actuator 68 may be capable of exerting a force of approximately 0.1 pound over the relatively small range of motion thereof.

The secondary carriage 72 is of relatively light weight in comparison to the primary carriage 48 and has a mass, including that of the transducer head 16, of the order of 5 to 10% of that of primary carriage 48. Secondary carriage 72 is positioned under control of actuator 68 to assume displacement $X_2$ relative to the position of primary carriage 48. Since the transducer head 16 is mounted directly on secondary carriage 72, the total displacement $X_T$ of transducer head 16 is equal to $X_1 + X_2$ relative to reference plane 62. The relatively low mass of the secondary carriage 72, including transducer head 16, relative to the primary carriage 48 permits rapid response of the control system 10 to changes in the position error signal and also permits the secondary carriage 72 and transducer head 16 to undergo substantial accelerations without inducing significant vibratory motion in the primary carriage 48 as a result of the oppositely directed reactive forces which are imparted to primary carriage 48 by secondary actuator 68 in response to accelerations of secondary carriage 72 and transducer head 16.

The displacement signal $X_2$ creates a bias which tends to drive the secondary carriage 72 toward a zero displacement position relative to primary carriage 48. Thus, as the transducer head 16 becomes nearly centered over a commanded track position, the magnitude of the velocity modified energization control signal at summer 66 is reduced below the magnitude of the displacement signal $X_2$ so that the secondary carriage 72 is driven in a direction tending to reduce the displacement $X_2$ relative to primary carriage 48 to zero. This relative motion of secondary carriage 72 may actually tend to slightly increase the magnitude of the position error signal. However, the primary actuator 50 continues to respond to the energization control signal which is dependent upon the position error signal and moves the primary carriage 48 toward the track center position as the relative displacement of secondary carriage 72 is reduced toward zero. The gain $K_D$ of amplifier 76 is chosen such that the displacement signal $X_2$ is unable to induce track position errors of sufficient magnitude to interfere with read and write disk operations. In other words, the maximum magnitude of the $X_2$ input signal to summer 66 does not exceed the maximum value of the velocity compensated energization control signal input to summer 66 when the transducer head 16 is sufficiently close to the center of a commanded track to permit reading and writing. The secondary carriage 72 is thus atuomatically centered relative to primary carriage 48 to permit optimum response in following small deviations in the radius of a track as the disk 12 rotates beneath the transducer head 16 without creating track position errors of sufficient magnitude to prevent read and write operations at the earliest possible time.

By way of example, assume that a position command is received by access control circuitry 32 which commands the transducer head 16 to be positioned radially inward by at least several track positions. A large access control signal is generated by access control circuitry 32 which causes secondary control circuits 36 to react by actuating secondary actuator 68 to drive secondary carriage 72 to a radially inward displacement $X_2$ of maximum amplitude relative to the position $X_1$ of primary carriage 48. Simultaneously, the resulting energization control signal operates on the primary control subsystem 30 to energize primary actuator 50 to begin moving primary carriage 48 radially inward at a rapid rate of speed $\dot{X}_1$ which is substantially less than the maximum speed of the secondary carriage 72. As the transducer head 16 moves toward the commanded track position the actual position and coarse position signals are periodically updated and as the head 16 approaches to within approximately one track position of the commanded track position, the access control circuitry causes a transition from a track access mode to a track follow mode in which the energization control signal decreases in magnitude sufficiently to cause primary actuator 50 to begin decelerating primary carriage 48. As the head 16 becomes positioned sufficiently close to the commanded track to permit read or write operations to commence, the position error signal becomes quite small and is further diminished by the velocity signal $\dot{X}_1$ which is communicated to summer 58 to reduce the velocity compensated energization control signal to a magnitude less than the displacement signal $X_2$ which is input to summer 66 by amplifier 76. Secondary actuator 68 is thus commanded to begin moving secondary carriage relatively radially outward and back toward a zero relative displacement position. However, because the primary actuator 50 continues to receive a positive position error signal, the primary carriage 48 continues to be moved radially inward at a velocity which exceeds the radially outward motion of secondary carriage 72 relative thereto to cause the head 16 to continue to be moved toward the track center and the position error signal to be reduced. As the head 16 approaches very close to the center of the commanded track and the relative displacement, $X_2$, of secondary carriage 72 approaches zero, the motion of the primary carriage 48 is substantially terminated. However, the secondary carriage 72 continues to respond to instantaneous, relatively small changes in the position error signal to permit the head 16 to follow small changes in the radius of the commanded track as disk 12 rotates about axis 14.

Figure 2:
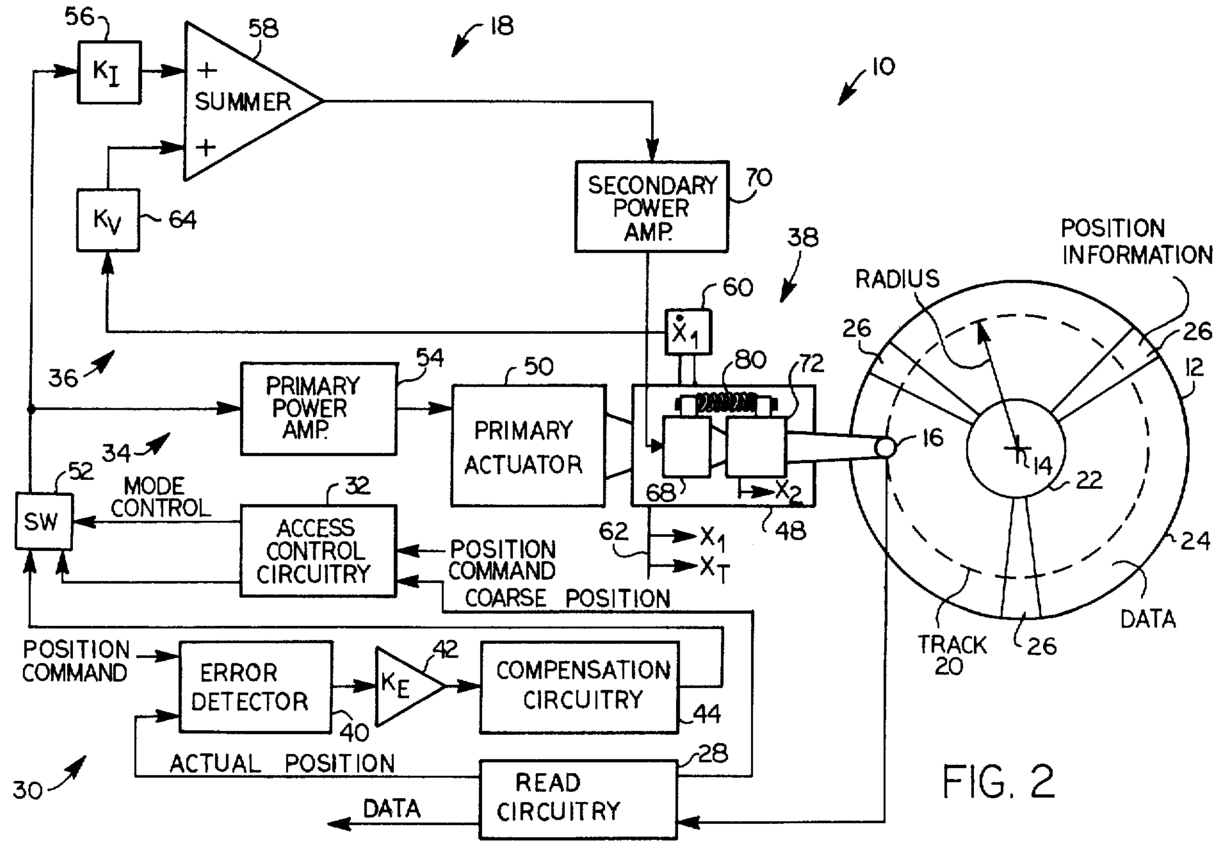
FIG. 2 is a block diagram representation of an alternative high density track follower control system in accordance with the invention.

In an alternative embodiment shown in FIG. 2, the electronic circuitry for biasing the secondary carriage 72 toward a zero displacement position relative to primary carriage 48 is replaced by a spring 80 coupling the secondary carriage to the primary carriage. Spring 80 is coupled such that the zero deflection position of spring 80 corresponds to the zero relative displacement position of secondary carriage 72. For the masses of the primary and secondary carriages 48 and 72, respectively, presented herein, the spring 80 should have a spring constant K in the range of 3,000 or more pounds per inch. With the zero displacement bias for the secondary carriage 72 being provided by spring 80, the secondary power amplifier 70 is responsive to the velocity compensated error signal from summer 58.

Although the above description has been directed to magnetic disk files, the scope of the invention is applicable to other high accuracy recording apparatus such as magnetic tape drives and magnetic card processors. Thus, while there have been shown and described above particular arrangements of dual carriage control systems in accordance with the invention which position the transducer head of a magnetic disk memory for the purpose of enabling a person of ordinary skill in the art to make and use the invention, it will be appreciated that the invention is not limited thereto. Accordingly, any modifications, variations, or equivalent arrangements within the scope of the attached claims should be considered to be within the scope of the invention.

What is claimed is:

1. In a magnetic disk recording system having a radially positionable transducer head mounted on a secondary carriage which is radially movable with respect to a primary carriage which is in turn radially movable with respect to a magnetic disk, a transducer head position control system coupled to receive head position command information and actual head position information and control the movement of the primary and secondary carriages to position the head at a commanded position, the position control system being operable to simultaneously position both the primary and secondary carriages in response to a difference between actual and commanded head positions with the secondary carriage having a predetermined bias toward a zero displacement position with respect to the first carriage.

2. Apparatus for controlling the position of a transducer relative to a selected one of a plurality of tracks of information recorded on a record surface movable relative to the transducer, the recorded information including transducer positioning information, the apparatus comprising:

a dual carriage assembly supporting the transducer, the assembly being movable to position the transducer relative to the selected track in response to error signals, the dual carriage assembly including:

a primary carriage;

a first actuator coupled to the primary carriage for displacing the primary carriage relative to a reference surface;

a secondary carriage mounted on the primary carriage for movement relative thereto, the transducer being affixed to the secondary carriage;

a secondary actuator coupled to the primary and secondary carriages for moving the secondary carriage relative to the primary carriage, the displacement of the transducer being the sum of the displacement of the primary carriage relative to a reference surface and the displacement of the secondary carriage relative to the primary carriage;

means for receiving transducer position command information and actual transducer position information from the transducer and generating a position error signal in response thereto;

first servo means responsive to the position error signal for energizing the first actuator to displace the primary carriage in relation to the reference surface toward a position at which the transducer is over the center of the selected track;

means for detecting and indicating the velocity of the primary carriage relative to the reference surface;

means for detecting and indicating the position of the secondary carriage relative to the primary carriage; and second servo means responsive to an algebraic summation of the position error signal generated by the transducer, the velocity of the primary carriage and the position of the secondary carriage relative to the primary carriage, for energizing the second actuator to displace the secondary carriage relative to the primary carriage.

3. A control system for radially positioning a transducer with respect to a selected one of a plurality of concentric tracks on a rotating information storage disk, the control system comprising:

a first carriage radially movable with respect to the information disk;

a first actuator coupled to radially move the first carriage in response to a first actuator control signal;

a second carriage mounted on the first carriage for supporting the transducer, the second carriage being movable with respect to the first carriage;

a second actuator coupled to radially move the second carriage with respect to the first carriage in response to a second actuator control signal;

an error detection subsystem coupled to receive information indicative of a commanded transducer head radial position and an actual transducer head radial position and generate a position error signal indicative of the difference therebetween;

a first control subsystem coupled to generate the first actuator control signal in response to the position error signal to move the first carriage in a direction tending to reduce the difference between commanded and actual transducer head positions; and a second control subsystem coupled to generate the second actuator control signal in response to the position error signal to move the second carriage with respect to the first carriage in a direction tending to reduce the difference between commanded and actual transducer head positions.

4. The control system as set forth in claim 3, wherein the actual position information for the error detection subsystem is obtained from the transducer in response to the sensing of magnetically recorded track positioning information.

5. The control system as set forth in claim 3 further comprising a position bias means coupled to bias the second carriage toward a predetermined zero displacement position with respect to the first carriage.

6. The control system as set forth in claim 5 wherein the position bias means includes a spring biasing means.

7. For use with an information recording system having a rotating magnetic disk for recording information in a plurality of concentric tracks thereon, a positioning system comprising:

a transducer head which is disposed adjacent a magnetic disk at a radially determinable position for magnetic coupling with the information on a selected one of the tracks;

a primary carriage disposed for radial motion to position the transducer head at a selected radial position within a range of radial positions having a substantial length with respect to the magnetic disk radius;

a primary actuator coupled to radially position the primary carriage in response to a primary actuator control signal;

a secondary carriage of substantially less mass than the primary carriage, the secondary carriage supporting the transducer head in fixed relation thereto and being mounted on the primary carriage to position the transducer head at a selected radial position relative to the primary actuator within a range of relative radial positions that is small with respect to the magnetic disk radius, the radial position of the transducer head being the sum of the primary carriage and relative secondary carriage positions;

a secondary actuator coupled to radially position the secondary carriage relative to the primary carriage in response to a secondary actuator control signal;

a position error detection subsystem coupled to receive transducer head position command information and transducer head actual position information and generate a position error signal in accordance with the difference between actual and commanded transducer head positions;

a primary control subsystem operating in response to the position error signal to generate a primary actuator control signal causing the primary carriage to be radially positioned so as to reduce the position error signal; and a secondary control subsystem operating in response to the position error signal to generate a secondary actuator control signal to control the position of the secondary carriage relative to the primary carriage.

8. The positioning system as set forth in claim 7 wherein the primary control subsystem includes lead compensation tending to increase the rate of response of primary carriage positioning to position error signals.

9. The positioning system as set forth in claim 7 wherein the secondary control subsystem includes means for biasing the secondary carriage toward a zero displacement position relative to the primary carriage.

10. The positioning system as set forth in claim 9 wherein the biasing means includes a mechanical spring coupled between the first and second carriages.

11. The positioning system as set forth in claim 9 wherein the biasing means includes a sensor coupled to detect the position of the secondary carriage relative to the primary carriage and generate a secondary carriage position signal dependent thereon and a summer connected to generate the secondary actuator control signal in accordance with the sum of a first signal dependent upon the position error signal and the secondary carriage position signal, the secondary carriage position signal tending to cause the generation of a secondary actuator control signal for positioning the secondary carriage at the zero displacement position.

12. The positioning system as set forth in claim 11 further comprising a detector coupled to detect motion of the primary carriage and generate a primary carriage velocity signal and wherein said first signal is indicative of a summation of signals which are dependent upon the position error signal and the primary carriage velocity signal.

13. The positioning system as set forth in claim 12 wherein the position error detection subsystem is coupled to receive actual head position information from the transducer head which is generated in response to information recorded on a magnetic disk and includes circuitry which processes a signal received from the transducer head to separate actual head position information from data information.

14. The positioning system as set forth in claim 13 wherein head position information is received discontinuously at discrete time intervals and the position error detection subsystem further includes circuitry for generating a continuous position error signal which is updated in response to the receipt of actual head position information.

15. A control system for positioning a transducer head with respect to a selected one of a plurality of tracks on an information storage surface, the control system comprising:

a first carriage which is transversely movable with respect to the tracks;

a first actuator coupled to transversely move the first carriage with respect to the tracks in response to a first actuator control signal;

a second carriage mounted on the first carriage for supporting the transducer, the second carriage being transversely movable with respect to the first carriage and the tracks;

a second actuator coupled to transversely move the second carriage with respect to the first carriage in response to a second actuator control signal;

an error detection subsystem coupled to receive information indicative of a commanded transducer head transverse position and an actual transducer head transverse position and generate a position error signal indicative of the difference therebetween;

a first control subsystem coupled to generate the first actuator control signal in response to the position error signal to move the first carriage in a direction tending to reduce the difference between commanded and actual transducer head positions; and a second control subsystem coupled to generate the second actuator control signal in response to primary carriage energization information.

16. The control system as set forth in claim 15 above, wherein the primary carriage energization information includes primary carriage acceleration information.

17. The control system as set forth in claim 15 above, wherein the primary carriage energization information includes primary carriage velocity information.

18. The control system as set forth in claim 15 above, wherein the primary carriage energization information includes both primary carriage acceleration information and primary carriage velocity information.

* * * * *